United States Patent [19]

Fujimoto et al.

[11] Patent Number: 4,607,495
[45] Date of Patent: Aug. 26, 1986

[54] METHOD OF AND APPARATUS FOR DISINTEGRATING LUMPS OF BOILED RICE WHILE COOLING AND FREEZING

[75] Inventors: Kiyokatsu Fujimoto, Oomiya; Kazunobu Shibuya, Tokyo; Tetsukazu Urata, Iruma, all of Japan

[73] Assignee: Toyo Sanso Co., Ltd., Tokyo, Japan

[21] Appl. No.: 721,813

[22] Filed: Apr. 10, 1985

[30] Foreign Application Priority Data

Apr. 26, 1984 [JP] Japan .................................. 59-84631

[51] Int. Cl.$^4$ ............................................. F25D 13/06
[52] U.S. Cl. ......................................... 62/63; 62/320; 99/537; 426/518; 426/524
[58] Field of Search ..................... 62/62, 63, 374, 320, 62/380, 381; 426/518, 524; 99/355, 537

[56] References Cited

U.S. PATENT DOCUMENTS 2,881,847  4/1959  Strasel .................................. 99/537
4,022,600  5/1977  Mutoh et al. ......................... 62/381

Primary Examiner—Ronald C. Capossela
Attorney, Agent, or Firm—Armstrong, Nikaido, Marmelstein & Kubovcik

[57] ABSTRACT

An apparatus for disintegrating lumps of boiled rice while cooling and freezing, comprising a cooling chamber and a freezing chamber through which boiled rice is caused to pass being carried on a mesh conveyor and thereby being cooled and frozen to a temperature from +10° C. to −30° C., and one or plurality of disintegrators disposed above and across the belt conveyor each comprising a rotary comb and a stationary comb both having a plurality of comb teeth disposed such that the teeth of the opposing combs are meshed with each other. In a preferred embodiment, the stationary comb of the disintegrator at the downstream of the mesh belt conveyor is disposed spaced apart from the belt conveyor by such a gap between the lower end of the comb teeth and the upper surface of the belt conveyor as allowing to pass only the individually disintegrated rice grains to pass therethrough.

1 Claim, 4 Drawing Figures

METHOD OF AND APPARATUS FOR DISINTEGRATING LUMPS OF BOILED RICE WHILE COOLING AND FREEZING

BACKGROUND OF THE INVENTION

1. Field of the Invention

This invention concerns a method of and apparatus for disintegrating lumps of boiled rice while cooling and freezing and, more specifically, it relates to a method of and apparatus for disintegrating lumps of boiled rice in which lumps of boiled rice are disintegrated by one or plurality of rice disintegrators each comprising a combination of a rotary comb and a stationary comb disposed above the track of a belt conveyor that passes through a cooling chamber and a freezing chamber while carrying the lumps of rice thereon.

2. Description of the Prior Art

Demands for frozen-dry products of boiled rice as preserved foodstuffs have been increased in more recent years as the cooking material for instantly cooking pilaff or the like. For the production of frozen-dry rice of this kind, a method of and apparatus for freezing and disintegrating boiled rice has been disclosed, for example, in Japanese Pat. No. 1177102, which comprises passing a belt conveyor carrying boiled rice thereon through each of chambers equipped with spontaneously cooling, pre-cooling and freezing respectively and beating the lumps of rice carried on the belt conveyor in the chambers by the teeth of a rotary comb placed above the track of the belt conveyor, thereby disintegrating the lumps of rice while cooling and freezing them.

However, in this proposed method and apparatus, since the lumps of rice carried on the belt conveyor are disintegrated merely by the beating action of the rotary comb teeth, it has been difficult to effectively apply the beating impact to the lumps of rice and, accordingly, the lumps of rice can not finely be disintegrated into individual rice grains but only into smaller sub-divided lumps each comprising rice grains atiched with each other. The commercial value of the frozen-dry rice will be degraded by the incorporation of such sub-divided lumps, because they bother the cooking work and impaire the taste and feeling when served as they are to the table.

SUMMARY OF THE INVENTION

The primary object of this invention is to provide a method of and apparatus for disintegrating lumps of boiled rice while cooling and freezing, in which the degree or efficiency of the disintegration can be improved.

Another object of this invention is to provide a method of and apparatus for finely disintegrating lumps of boiled rice while cooling and freezing in which the lumps of boiled rice can be disintegrated due to the combined effect of leaping-up the lumps by the rotary comb and of colliding the leaped-up lumps against the stationary comb, in addition to the beating effect by the rotary comb.

A further object of this invention is to provide a method of and apparatus for disintegrating the lumps of boiled rice while cooling and freezing, in which the beating impact can surely be transmitted to the lumps of boiled rice by applying the beating action to the lumps while blocking the movement thereof.

A still further object of this invention is to provide a method of and apparatus for disintegrating the lumps of boiled boiled rice while cooling and freezing, in which the lumps of rice can surely be disintegrated into individual grains of the frozen rice.

A yet further object of this invention is to provide a frozen-dry rice product at high quality which is disintegrated finely into individual frozen rice grains.

The primary object of this invention can be attained by an apparatus for disintegrating the lumps of boiled rice while cooling and freezing, in which one or plurality of disintegrating means each having a rotary comb and a stationary comb are disposed such that the comb teeth of the opposing rotary and stationary combs are engaged with each other.

Another object of this invention can be attained by an apparatus for disintegrating the lumps of boiled rice while cooling and freezing, in which the stationary comb is disposed to the upstream of the rotary comb along the conveyor track.

The further object of this invention can be attained by an apparatus for disintegrating the lumps of boiled rice while cooling and freezing in which the stationary comb is disposed to the downstream of the rotary comb along the conveyor track.

The still further object of this invention can be attained by an apparatus for disintegrating the lumps of boiled rice while cooling and freezing, wherein an upstream disintegrator in which a stationary comb is disposed to the upstream of a rotary comb and a downstream disintegrator in which a stationary comb is disposed to the downstream of a rotary cam are provided opposing to each other, and wherein the stationary comb in the upstream disintegrator is disposed with such a gap between the lower end thereof and the upper surface of the belt conveyor that allows the lumps of boiled rice to pass therethrough and the stationary comb in the downstream disintegrator is disposed with such a gap between the lower end thereof and the upper surface of the belt conveyor that allows only the individually disintegrated rice grains to pass therethrough.

The yet further object of this invention can be attained by a method of disintegrating lumps of boiled rice which comprises a step of cooling and freezing boiled rice to a temperature between 10° C. and −30° C. while carrying the same as a layer on a belt conveyor, a step of colliding the lumps of boiled rice on the belt conveyor against a stationary comb and thereby sharing them while cooling and freezing, and a step of beating the lumps of boiled rice by a rotary comb rotating at a circumferential velocity from 1 to 10 m/sec before and/or after the sharing step by the stationary comb.

BRIEF DESCRIPTION OF THE ACCOMPANYING DRAWINGS

FIG. 1 is a longitudinal cross sectional view of an apparatus for disintegrating the lumps of boiled rice while cooling and freezing them according to a preferred embodiment of this invention, FIG. 2 is a cross sectional view taking along line II—II in FIG. 1, FIG. 3 is a perspective view showing the positional relationship between a rotary comb and a stationary comb constituting a main part of this invention, and FIG. 4 is a side elevational view showing the positional relationship for the stationary comb at the upstream and the stationary comb at the downstream in a preferred embodiment according to this invention.

DETAILED DESCRIPTION OF THE INVENTION

Figure 1:
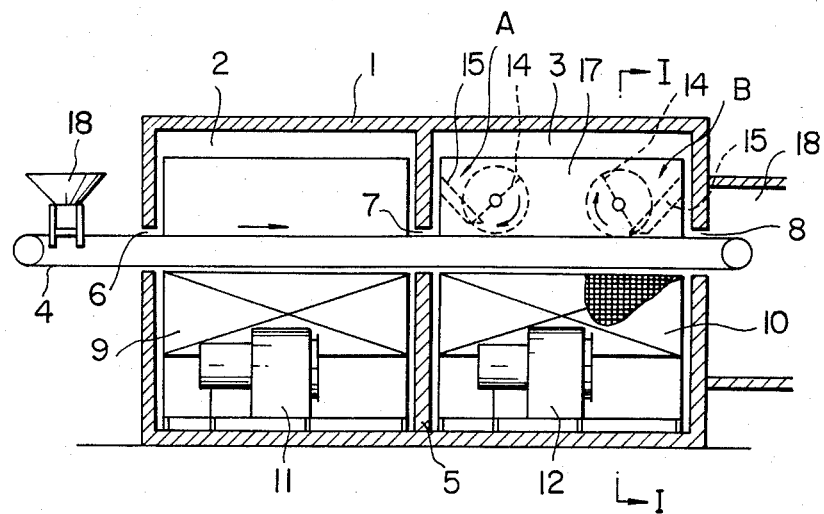

The apparatus for disintegrating the lumps of boiled rice while cooling and freezing according to this invention includes a heat insulation housing 1 comprising a cooling chamber 2 and a freezing chamber 3, through which a belt conveyor 4 carrying lumps of boiled rice thereon is caused to pass for disintegrating the lumps of boiled rice during cooling and freezing steps.

For attaining the above purpose, the inside of the heat insulation housing 1 is divided by a partition plate 5 into the cooling chamber 2 and the freezing chamber 3, and openings 6, 7 and 8 are formed at both ends of the heat insulation housing 1 and the partition plate 5 for passing the belt conveyor 4 carrying lumps of boiled rice thereon.

The belt conveyor 4 is disposed through the openings 6, 7 and 8 horizontally to the heat insulation housing 1 while being protruded at the turning ends thereof from the housing and is passed through the cooling chamber 2 and the freezing chamber 3 in the direction of the arrow driven by a drive means such as a motor not illustrated in the drawing.

The cooling chamber 2 and the freezing chamber 3 have their respective heat exchangers 9 and 10 connected with a fron refrigerator or the like (not illustrated) and respective blowers 11 and 12 corresponding to them, such that cold air is circulated from below the belt conveyor to cool or freeze the lumps of boiled rice on the belt conveyor to a temperature from 10° C. to −30° C. For this purpose, the belt conveyor 4 made of mesh-like endless belt is preferably used. The mesh size is adjusted to such a fine size as not allowing the rice grains to fall through the mesh openings.

Above the track of the mesh-like belt conveyor 4 in the cooling chamber 2 and/or freezing chamber 3, one or plurality of rotary combs 14 rotated by drive means 13 such as a motor and rotation transmitting mechanisms 13' such as coupling are rotatably mounted above and across the conveyor track. Further, one or plurality of stationary combs 15 are disposed opposing to and in the vicinity of one or more of the rotary combs 14 such that the rotating teeth 14a of each of the rotary combs 14 are meshed between adjacent teeth 15a, 15a of each of the stationary combs 15.

Figure 2:
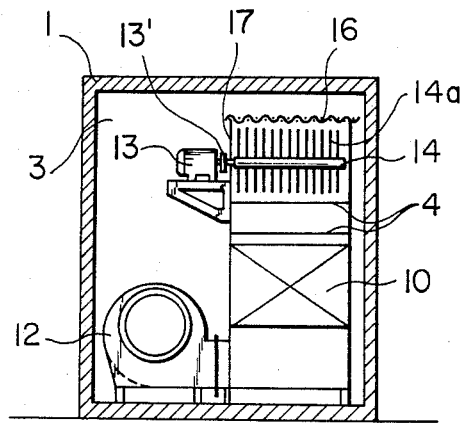

As shown in FIG. 2, the rotary comb 14 has a plurality of integrally secured comb teeth 14a such that the top ends of the comb teeth 14a are in contact with the lumps of boiled rice on the mesh belt conveyor 14, and the comb 14 is disposed rotatably in the direction reverse to the proceeding direction of the conveyor as shown in FIG. 1.

The rotary comb 2 and the stationary comb 3 are enhoused within a housing 17 defined with side plates and a mesh-like ceiling cover 16 so that the rice grains may not be scattered around upon their disintegration.

As described above, the features of this invention resides in the disintegrator which comprises, in combination, the rotary comb 14 and the stationary comb 15 arranged such that their comb teeth 14a and 15a are meshed with each other, and which is disposed above and across the track of the belt conveyor passing through the cooling chamber 2 and/or the freezing chamber 3.

Figure 3:
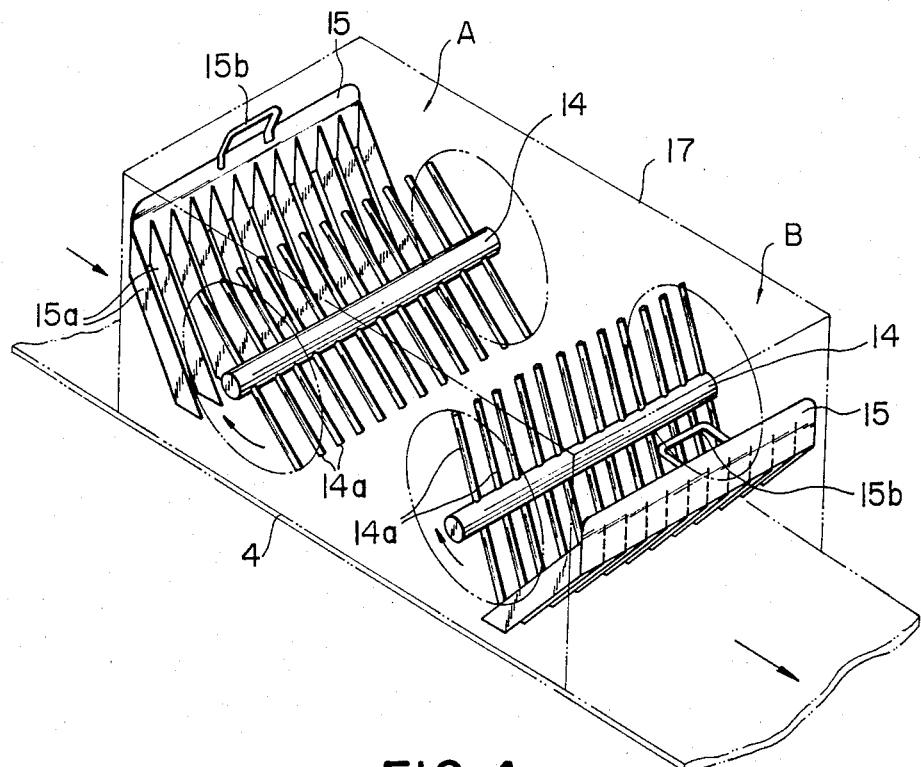

The positional relationship between the rotary comb 2 and the stationary comb 3 of the disintegrator includes various embodiments as described below. Namely, the stationary comb 15 may be disposed upstream to the rotary comb 14 along the conveyor as shown in the left hand part of FIG. 3, or it may be disposed downstream to the rotary comb 14 as shown in the right hand part of FIG. 3. Further, a disintegrator (downstream integrator) comprising the rotary comb 14 and the stationary comb 15 disposed downstream thereto may be provided opposingly at the downstream of another disintegrator (upstream integrator) comprising the rotary comb 14 and the stationary comb 15 disposed upstream thereto as shown entirely in FIG. 3.

As shown in the figure, the stationary comb 15 is preferably disposed while slanting the comb teeth 15a by an angle of $\alpha°$ to the vertical line toward the mating rotary comb 14. However, this invention is no way limited only to the aforementioned structure but any of other designs may be employed, so long as a portion of the comb teeth 15a may mesh with the rotary comb teeth 14a, for instance, the stationary the comb teeth 15a may be disposed horizontally.

The stationary comb 15 has a handle 15b mounted at the upper portion thereof so that it may detachably be mounted to the casing 17 by means of bolts, nuts and the likes.

Figure 4:
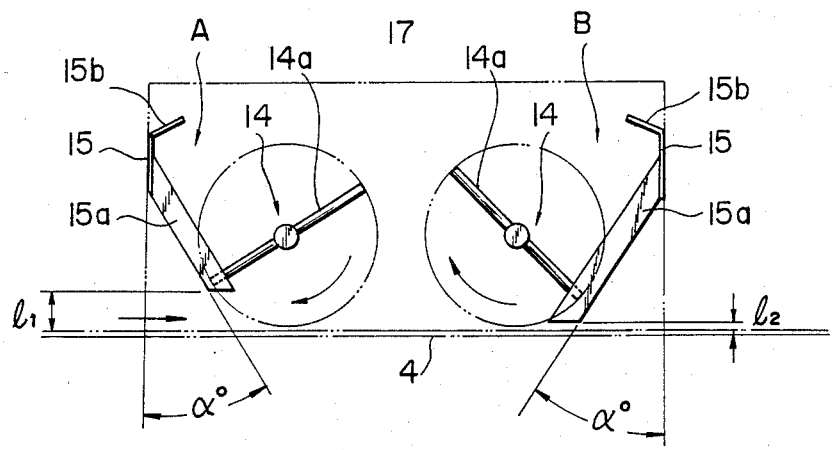

In a case where the upstream disintegrator A in which the stationary comb 15 is disposed upstream to the rotary comb 14 and the downstream disintegrator B in which the stationary comb 15 is disposed downstream to the rotary comb 14 are arranged opposing to each other, a gap l1 is preferably set for the stationary comb 15 in the upstream disintegrator between the lower end of the comb teeth 15a and the upper surface of the belt conveyor 4 for allowing the lumps of boiled rice to pass therethrough, while a gap l2 is preferably set for the stationary comb 15 in the downstream disintegrator B between the lower end of the comb teeth 15a and the upper surface of the belt conveyor 4 for allowing only the individually disintegrated rice grains to pass therethrough as shown in FIG. 4. Although, in the illustrated embodiment, the disintegrators are disposed in the freezing chamber 3, this invention is no way limited only thereto but the disintegrators may be disposed in the cooling chamber 2 or in both of the cooling chamber 2 and the freezing chamber 3 so long as the temperature of the lumps of rice is kept between +10° C. and −30° C.

The operation of the apparatus according to this invention will now be described.

Boiled rice is supplied through a hopper 18 disposed to the outside at the inlet of the heat insulation housing 1 and then spread as a layer on the running belt conveyor 4. The spread rice carried on the belt conveyor 4 is allowed to cool till it arrives at the inlet opening 6 of the heat insulation housing 1 and further cooled and frozen to a temperature from +10° C. to −30° C. during the step of passing through the cooling chamber 2 and the freezing chamber 3 in the heat insulating housing 1.

The rotary comb 14 disposed above the belt conveyor 4 in the cooling chamber 2 and/or the freezing chamber 3 are rotated with the circumferential velocity at the top end of the comb teeth 14a from 1 to 10 m/sec in the direction of returning the frozen lumps of boiled rice on the belt conveyor 4. With this rotation, the disintegrating process is performed as described below.

In the disintegrator A comprising the rotary comb 14 combined with the stationary comb 15 at the upstream thereof, the layered lumps of boiled rice transferred along the belt conveyor 4 are collided against the stationary comb 15 and sub-divided into a relatively large mass of rice and then disintegrated by being beaten with the rotating comb teeth 14a, while at the same time, leaped upwardly by the top end of the comb teeth 14a. The leaped-up lumps of boiled rice collide against the comb teeth 15a of the stationary comb 15, whereby the disintegration is promoted by the impact shock upon falling.

Further, in the disintegrator B comprising the rotary comb 14 and the stationary comb 15 combined to the downstream thereof, the stream of the disintegrated lumps of boiled rice is instantaneously blocked or held by the stationary comb 15 and, in this held state, beaten by the comb teeth 14a of the rotary comb 14. Accordingly, successive beatings can be applied to a certain lump of rice. In addition, since the lumps of boiled rice is caught and held between the stationary comb teeth 15a of the downstream integrator B, the beating impact can be applied effectively. Furthermore, a portion of the lumps is leaped by the rotary comb 14 rotating at the circumferential velocity from 1 to 10 m/sec and then fallen and collided against the stationary comb teeth 15a to be disintegrated finely.

Furthermore, in a specific embodiment comprising a plurality of disintegrators, in which such a gap is formed between the lower end of each of the stationary comb teeth 15a and the upper surface of the belt conveyor 4 as allowing only the individual rice grains to pass therethrough, the lumps of boiled rice can be disintegrated completely and uniformly to obtain frozen-dry rice separated into individual grains. The thus finely disintegrated rice grains are transferred from the downstream end of the conveyor 4 to a packaging chamber 18.

It has been be confirmed that the circumferential velocity at the top end of the rotary comb teeth 14a preferably ranges from 1 to 10 m/sec, while it is somewhat different depending on the temperature of boiled rice (10° C. to −30° C.) or the kind of rice (the rice as boiled, pilaff-like rice incorporated with cooling oils, etc.). Specifically, if the velocity is below the lower limit, the effect of disintegrating the lumps of boiled rice into individual grains is insufficient and, on the other hand, if the velocity is higher than the upper limit, the individual rice grains may further be pulverized undesirably.

What is claimed is:

1. A method of disintegrating lumps of boiled rice which comprises (a) cooling and freezing boiled rice to a temperature between 10° C. to −30° C. while carrying the boiled rice as a layer on a belt conveyor, (b) colliding the lumps of boiled rice on the belt conveyor against a stationary comb and thereby separating them while cooling and freezing, and (c) beating the lumps of boiled rice with a rotary comb rotating at a circumferential velocity of from 1 to 10 m/sec, the beating step occurring at a time chosen from at least one of before, during and after the separating step by the stationary comb.

* * * * *